United States Patent [19]

Gard

[11] Patent Number: 4,906,928
[45] Date of Patent: Mar. 6, 1990

[54] TRANSIENT ELECTROMAGNETIC APPARATUS WITH RECEIVER HAVING DIGITALLY CONTROLLED GAIN RANGING AMPLIFIER FOR DETECTING IRREGULARITIES ON CONDUCTIVE CONTAINERS

[75] Inventor: Michael F. Gard, Plano, Wis.

[73] Assignee: Atlantic Richfield Company, Los Angeles, Calif.

[21] Appl. No.: 291,608

[22] Filed: Dec. 29, 1988

[51] Int. Cl.⁴ .................. G01N 27/82; G01R 33/12; G01R 19/25; H03M 1/18
[52] U.S. Cl. ................................... 324/240; 324/242; 328/167; 328/167; 341/139
[58] Field of Search ............... 324/229, 230, 236–243, 324/336; 307/520, 540; 328/151, 165, 167, 168; 341/139; 455/234; 367/65–67

[56] References Cited

U.S. PATENT DOCUMENTS

| | | | |
|---|---|---|---|
| 3,685,047 | 8/1972 | Sherer et al. | 341/139 |
| 3,707,672 | 12/1972 | Miller et al. | 324/239 |
| 3,737,768 | 6/1973 | Lazenby et al. | 324/336 |
| 3,790,886 | 2/1974 | Kurtin et al. | 341/139 X |
| 3,819,864 | 6/1974 | Carroll et al. | 367/67 X |
| 4,016,557 | 4/1977 | Zitelli et al. | 341/139 |
| 4,027,281 | 5/1977 | Greve et al. | 341/139 X |
| 4,247,821 | 1/1981 | Buselli et al. | 324/336 |
| 4,600,356 | 7/1986 | Bridges et al. | 324/329 X |
| 4,717,006 | 1/1988 | Chapman et al. | 324/239 X |
| 4,831,378 | 5/1989 | Baars et al. | 341/139 |
| 4,843,320 | 6/1989 | Spies | 324/240 |

OTHER PUBLICATIONS

Bednar, "Applications of Median Filtering to Deconvolution, Pulse Estimation, and Statistical Editing of Seismic Data", Geophysics, vol. 48, No. 12 (Dec. 1983), pp. 1598–1610.

McCracken et al., "A Comparison of Electromagnetic Exploration Systems", Geophysics, vol. 51, No. 3 (Mar. 1986), pp. 810–818.

Ott, "Noise Reduction Techniques in Electronic Systems", John Wiley & Sons, pp. 91–97.

Primary Examiner—Gerard R. Strecker
Attorney, Agent, or Firm—Geoffrey Mantooth

[57] ABSTRACT

A transient electromagnetic apparatus for use in detecting irregularities on conductive walls of containers forms a multichannel distributed system and includes at least one transmitting antenna, at least one transmitter unit, plural receiving antennas, plural receiver units, and a computer for controlling the transmitter and receiver units. The receiver units each include elements that suppress noise in the received signals. Each receiver unit has a preamplifier, first and second low pass Bessel type filters, a gain ranging amplifier, and an A/D converter. The gain ranging amplifier receives feedback from the output of the A/D converter and provides increased small signal resolution. Each receiver unit also rejects common mode noise with a choke and balanced input impedances in the preamplifier. The apparatus allows an arbitrary number of receiving antennas, receiver units, and even transmitting antennas, and transmitting units, so that the apparatus can be configured to a variety of containers. Each receiver unit has control logic for controlling the electronics therein and memory for storing data for transfer to the computer. The apparatus includes a median filter for filtering out sferics noise.

16 Claims, 2 Drawing Sheets

TRANSIENT ELECTROMAGNETIC APPARATUS WITH RECEIVER HAVING DIGITALLY CONTROLLED GAIN RANGING AMPLIFIER FOR DETECTING IRREGULARITIES ON CONDUCTIVE CONTAINERS

FIELD OF THE INVENTION

The present invention relates to apparatuses utilizing transient electromagnetic phenomena in detecting irregularities on conductive walls of containers such as pipelines, storage vessels, pressure vessels, and the like.

BACKGROUND OF THE INVENTION

It has been discovered that methods utilizing transient electromagnetic phenomena can detect wall loss, typically but not exclusively due to corrosion, on the conductive walls of pipelines and other types of containers. In the transient electromagnetic (TEM) method, a transmitting antenna and a receiving antenna are placed in proximity to the pipeline wall. The transmitting antenna is provided with an abruptly changing current so as to induce current into the wall of the pipe. The induced current decays over a short period of time; the decay of the induced current is detected by the receiving antenna and a receiver. The TEM method is particularly useful in detecting wall loss due to corrosion on pipelines wrapped with insulating material and covered with a protective metal jacket. Prior art methods such as ultrasonics and radiography have proven inadequate or very expensive in detecting corrosion through insulation and metal jacketing. Insulated pipelines cannot be economically inspected if the insulation must be removed for inspection.

In testing the feasibility of the TEM method of detecting corrosion, the commercially available SIROTEM unit, manufactured by Geoex Pty. Ltd. of Adelaide, Australia was used. The SIROTEM unit is disclosed in Buselli et al., U.S. Pat. No. 4,247,821. The SIROTEM unit was designed with geophysical prospecting in mind. As such, many features of the SIROTEM unit are either unsatisfactory or insufficient for corrosion detection. This is particularly true in noise suppression. Detecting corrosion through insulation and metal cladding requires data acquisition at relatively late times when it becomes difficult to distinguish the signal from noise. By reducing or suppressing noise, the sensitivity of the detection apparatus can be increased. In reducing noise, the apparatus must faithfully amplify and process the time domain signals to prevent distortion of the phase and phase-related parameters of the signals.

Another disadvantage to the SIROTEM unit is its inflexibility in being adaptable to other procedures. The SIROTEM unit is equipped with one transmitting antenna and one receiving antenna. It is difficult to adapt the SIROTEM unit to detection operations on containers, and in particular on pipelines. Pipelines have symmetrical characteristics that can be taken advantage of by detection apparatuses with plural receiving antennas.

Therefore, what is needed is a TEM apparatus with improved noise suppression capabilities and with increased flexibility for use in corrosion detection applications.

SUMMARY OF THE INVENTION

It is an object of the present invention to provide a TEM apparatus for use in detecting irregularities on conductor walls of containers, which apparatus has improved noise suppression capabilities.

It is a further object of the present invention to provide a TEM apparatus for use in detecting irregularities on conductive walls of containers, which apparatus allows increased flexibility in configuring the apparatus for various containers.

The present invention includes a transmitting antenna, a transmitter unit connected to the transmitting antenna, a receiving antenna, a receiver unit connected to the receiving antenna, and control means for controlling the operation of an arbitrary number of transmitter and receiver units. The transmitter unit provides an abruptly changing current to the transmitting antenna so as to establish an electromagnetic field around the transmitting antenna.

The receiver unit includes elements which suppress noise in the signals obtained from the receiving antenna. These received signals represent the decaying induced current in a container means wall which is being investigated for irregularities. The receiver unit includes a preamplifier, a low pass filter, and an A/D converter which are serially interconnected. The receiver unit also includes common mode noise rejection means and a gain ranging amplifier. The gain ranging amplifier is connected with the analog input of the A/D converter and receives feedback from the output of the A/D converter such that the gain of the gain ranging amplifier is dependent on the digital output of the A/D converter. The gain ranging amplifier provides greater resolution for small received signal levels. The low pass filter is a Bessel type filter. The common mode noise rejection means includes a common mode choke serially interconnected with the input of the receiving antenna, and balanced input impedances into the preamplifier.

In one aspect of the invention, the low pass filter is a first low pass filter and the apparatus includes a second low pass Bessel type filter, with the first low pass filter being connected with the input of the preamplifier and the second low pass filter being connected with the output of the preamplifier.

In another aspect, the low pass filters are at least third order filters to prevent aliasing in the digitized received signal.

In still another aspect, the apparatus includes at least one transmitting antenna, at least one transmitter unit, plural receiving antennas connected with plural receiving channels, and plural receiver units having the receiving channels, so as to form a multichannel distributed system. The apparatus provides flexibility in devising configurations to adapt to a variety of containers and to take advantage of any geometrical characteristics of the containers.

In another aspect, the apparatus includes a median filter for filtering out sferics noise.

DESCRIPTION OF THE PREFERRED EMBODIMENT

Figure 1:
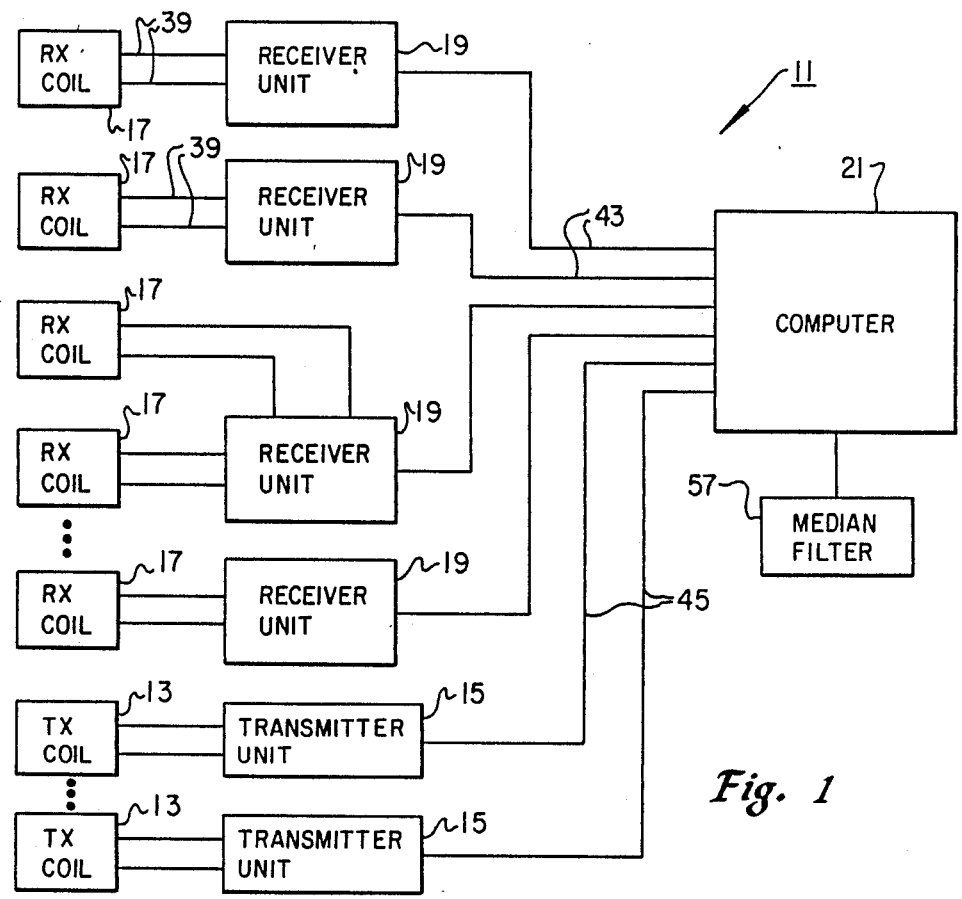
FIG. 1 is a block diagram of the TEM apparatus of the present invention, in accordance with a preferred embodiment.

In FIG. 1, there is shown a block diagram of the transient electromagnetic (TEM) apparatus 11 of the present invention, in accordance with a preferred embodiment. The apparatus is used for detecting irregularities, such as wall loss due to corrosion, on the conductive walls of containers such as pipelines, storage vessels, pressure vessels, and the like. The apparatus 11 of the present invention includes at least one transmitting antenna 13, at least one transmitter unit 15, plural receiving antennas 17, plural receiver units 19, and a conventional digital computer 21. The transmitter unit 15 and the receiver units 19 are separate from each other and are somewhat independently operated so as to form a distributed TEM system for detecting irregularities on container walls. An arbitrary number of transmitting antennas, transmitter units, receiving antennas, and receiver units can be used, as shown in FIG. 1. However, in the preferred embodiment, only one transmitting antenna and one transmitter unit is used. Thus, in the description that follows, the apparatus will be described as including only one transmitting antenna and one transmitter unit.

The transmitting antenna 13 is a coil of conductive wire wrapped around a core means. The core means is made of a non-magnetic and non-conductive material such as plastic. The transmitting antenna coil 13 is made up of relatively heavy gauge wire which can carry 2-5 amps of current. The number of turns of the transmitting antenna coil are kept to a minimum to minimize the selfinductance of the coil and provide for an abrupt change in current flowing through the coil.

Figure 4:
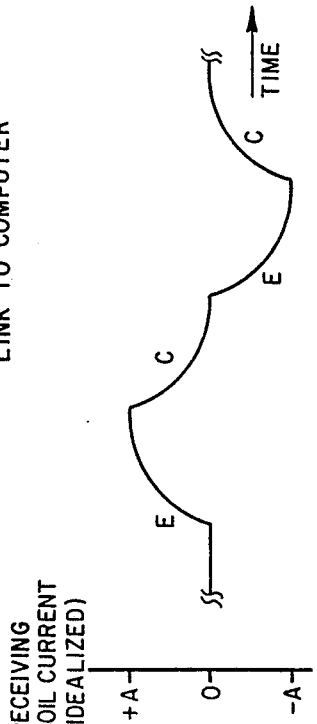
FIG. 4 is a graph showing an idealized waveform produced by the transmitter.

The transmitting antenna coil 13 is connected to the transmitter unit 15. The transmitter unit 15 provides a train of pulses with alternating polarity (see FIG. 4). Bipolar operation is provided by a conventional electronic H-bridge (not shown), whereby the transmitting antenna coil 13 is the center segment of the H-bridge. The pulses have abrupt rise and fall times on the order of 10-100 microseconds. The duration of each pulse and the duration of the off time between pulses are sufficiently long so as to stabilize the current or lack thereof, in order to minimize inducing currents before the leading or trailing edges of a pulse.

Each receiving antenna 17 is a coil of conductive wire wrapped around a core means, which is similar to the core means of the transmitting antenna coil. Each receiving antenna coil is wrapped around an individual core means that is distinct from the respective core means of the other receiving antenna coils and the transmitting antenna coil. Each receiving coil antenna is made up of relatively light gauge wire.

Each receiving antenna coil 17 is connected to a receiver unit 19. The receiver units 19 of the apparatus of the present invention include several aspects that reduce noise. In TEM detection of irregularities on container walls, the receiver units 19 produce received signals which represent the decaying induced current in the container wall. The received signals decay over a period of time, until the signals become indistinguishable from noise. The portions of the received signals which are of interest in TEM detection are the intermediate and late time portions, which is when the signal levels are approaching noise. The late time portions are particularly of interest if the container wall is covered with insulation and metal cladding. If the noise is reduced, the received signals can be examined over greater periods of time, thereby providing more information on the container wall.

Figure 3:
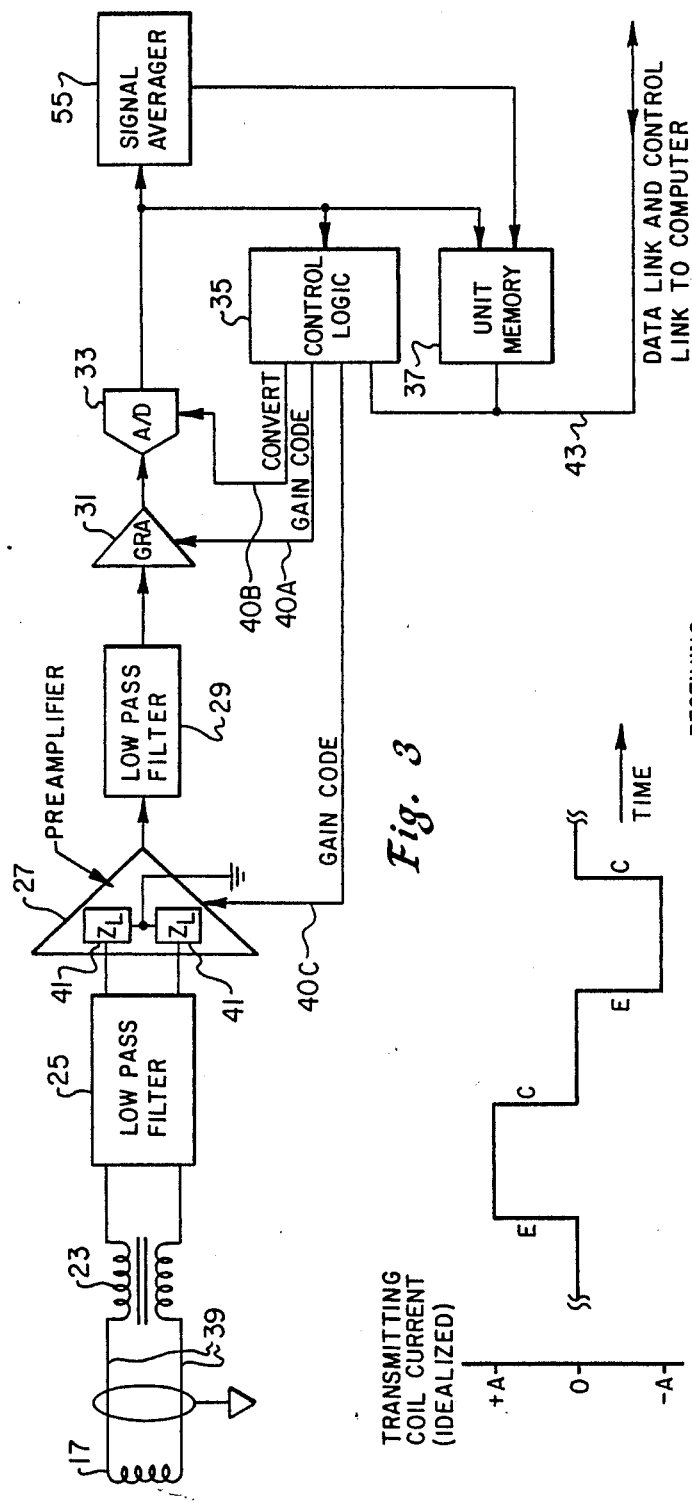
FIG. 3 is an electrical schematic diagram of a receiver unit.

FIG. 3 shows an electrical schematic diagram of the electronics in a receiver unit 19 as connected with a receiving antenna 17. Each receiver unit includes a common mode choke 23, a first low pass filter 25, a preamplifier 27, a second low pass filter 29, a gain ranging amplifier 31, an analog-to-digital (A/D) converter 33, control logic 35, and memory 37.

The receiver unit has shielded input conductors 39 that are connected to the respective receiving antenna coil 17. The input conductors 39 are connected to the common mode choke 23 which reduces common mode noise such as powerline noise and sferics. The choke 23 is connected to the input of the first low pass filter 25.

The first low pass filter 25 attenuates VLF transmitter signals. The first and second low pass filters 25, 29 serve as antialiasing filters. The first and second low pass filters 25, 29 are Bessel types of filters. TEM is a time domain, as opposed to a frequency domain, technique. Therefore, the receiver unit electronics should amplify and process the signals received by the receiving antenna coil so that the temporal characteristics of the signals, and in particular the phase and phase-related parameters, are either unaltered or affected in predictable or compensable ways. Bessel filters are well suited for time domain instrumentation because they have accurate time responses. Bessel filters have little or no distortion to the phase or phase-related parameters of received signals. In the preferred embodiment, the first and second low pass Bessel filters 25, 29 are passive and fifth order filters. The first low pass filter 25 is a balanced (differential) filter. The high order, which provides a steep increase in attenuation after the $3db$ breakpoint, prevents aliasing of the received signal. Lower order low pass filters, for example third order filters, could be used if less steep attenuations were acceptable. Aliasing occurs during digitization of the received signals when high frequency portions of the received signals fold over into the low frequency portions. In the preferred embodiment, the sampling rate is 20 KHz; thus, the Nyquist frequency of 10 KHz; the first low pass filter has its $-3db$ breakpoint at 4 KHz and at 10 KHz the response is $-25db$; the second low pass filter has its $-3db$ breakpoint at 2.5 KHz and at 10 KHz the response is $-40db$.

The output of the first low pass filter 25 is connected to the input of the preamplifier 27. One primary purpose of the preamplifier 27 is to reduce any common mode noise that is passed through the choke 23 and is still present in the received signal. The preamplifier 27 minimizes common mode noise by having balanced input impedances 41. Because of the need to reduce common mode noise in the preamplifier, the gain of the preamplifier can be relatively small.

The output of the preamplifier 27 is connected to the input of the second low pass filter 29, which has been described hereinabove. The output of the second low pass filter 29 is connected to the input of the gain ranging amplifier 31. The output of the gain ranging amplifier is connected to the analog input of the A/D converter 33.

The gain ranging amplifier receives feedback from the digital output of the A/D converter, via the control logic 35, as will be explained in more detail hereinbelow. The gain ranging amplifier 31 is a variable gain amplifier whose gain is dependent on the signal level of the digitized received signal produced by the A/D converter. The gain ranging amplifier 31 increases the effective dynamic range of the A/D converter 33, particularly for very small signal levels. Without a gain ranging amplifier, very small signals, which are of interest in TEM detection methods, appear at the low end of the A/D converter input scale clustered together, with little or no resolution between the signals themselves and little or no resolution between the signals and noise. This is because the A/D converter digitizes input signals to a specified number of bits over a fixed input scale (typically 0–10 volts). When a small or very small signal is detected, the gain in the gain ranging amplifier is increased, causing the signals to spread out over the A/D converter input scale. Resolution between small signals is thus increased.

The output of the A/D converter 33 is connected to the input of the control logic 35. The control logic 35 produces a gain code output signal 40A to the gain ranging amplifier 31, which sets the gain of the gain ranging amplifier; a convert code output signal 40B to the A/D converter 33, which causes the A/D converter to initiate a conversion; and another gain code output signal 40C to the preamplifier 27, which sets the gain of the preamplifier. The preamplifier gain is typically set by the operator and is unchanged for the duration of the measurements. The gain ranging amplifier gain is instantaneously controlled by the control logic during a single measurement. The control logic compares the digital signal from the A/D converter to a reference window, which in the preferred embodiment is 20–80% of the full scale of the A/D converter output. If the digital signal is found to be out of that window, then the control logic instructs the gain ranging amplifier to change gain accordingly. The gain codes become part of the data for use in subsequent processing. The control logic controls the operation of the receiver unit, on command by the computer. The computer can thus synchronize individual receiver unit operations to other operations such as the operation of the transmitter unit and the operation of other receiver units. The memory 37 in each receiver unit 19 is for storing instruction sets for the control logic and for storing the digitized received signals. The size of the memory depends on how frequently the data is downloaded to the computer. The less frequently the data is downloaded to the computer, the larger the memory 37 must be.

The control logic 35 and the memory 37 in the receiver unit 19 are connected to the computer 21 via the control and data link 43. The transmitter unit 15 is also connected to the computer 21, although by a separate control link 45 (see FIG. 1). The computer 21 has interface means, such as a keyboard and a monitor, to allow an operator to interactively control the apparatus. The operator can, for example, set the gain of the preamplifier 27 in each receiver unit 19 by so instructing the computer. The computer 21 then instructs the control logic 35 which produces the appropriate gain code for the preamplifier 27. The computer 21 also provides synchronization of the operation between the transmitter and receiver units 15, 19, regardless of the number of transmitter and receiver units being used. The computer also provides processing of the received signals and display of the processed signals.

Figure 2:
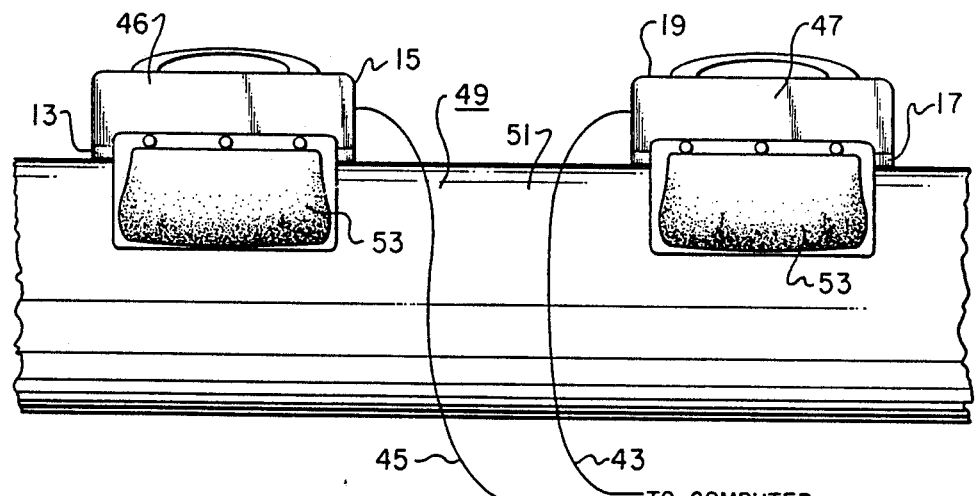
FIG. 2 is a schematic side view of a portion of the TEM apparatus of the present invention set up to detect corrosion along a portion of a pipeline.

Each receiver unit 19 is connected to at least one receiving antenna coil 17. Plural receiving antennas 17 can be connected to a single receiver unit 19. The connection between the receiving antenna coils and the respective receiver units is made with a short twisted shielded pair of wires 39, in order to minimize noise pickup. In FIG. 2, there is shown a transmitter unit 15, with its associated transmitting antenna coil 13, and a receiver unit 19, with its associated receiving antenna coil 17. The respective electronics of the transmitter and receiver units are contained within respective housings 46, 47. Each unit additionally contains a battery pack for power supply purposes. The transmitting antenna coil 13 and the receiving antenna coil 17 are located beneath the respective housings 46, 47. Thus, the wire connection 39 between the receiving antenna coil 17 and the receiver unit electronics can be made very short. The receiver units 19 can be located relatively far away from the computer. The receiver units produce large digital signals on the data links 43 to the computer, which are relatively insusceptible to noise.

Figure 5:
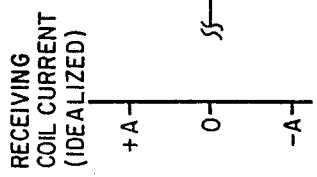
FIG. 5 is a graph showing the idealized induced current waveform resulting from the transmitted waveform of FIG. 4, as received by a receiver unit.

The setup and operation of the apparatus 11 of the present invention will now be described, with reference to a pipeline 49. In FIG. 2, a transmitter unit 15 and a receiver unit 19 are positioned on the pipeline 49 with the respective antenna coils 13, 17 in proximity with the pipeline wall 51. The units are held onto the pipeline by suitable means, such as sand bags 53 which depend from the sides of each unit. The transmitting antenna coil 13 and the receiving antenna coil 17 form a loop-loop configuration, wherein the respective coils are wound on separate core means which are separated by some distance. Plural receiver units with plural receiving antenna coils can be positioned on the pipeline so as to form a plural channel distributed system. For example, the receiving units could be positioned longitudinally along the pipeline, on each side of the transmitter unit. To operate the apparatus of the present invention, the transmitter unit 15 provides a train of pulses with alternating polarity (see FIG. 4) to the transmitting antenna coil 13 so as to establish an electromagnetic field around the coil and induce current into the pipe wall 51. Each pulse has a leading edge E, wherein the electromagnetic field is established in the pipe wall 51, and a trailing edge C, where the electromagnetic field in the pipe wall collapses. The computer 21 synchronizes the operation of the receiver units 19 so that as the current in the transmitting antenna coil begins to abruptly change, the receiver units begin to measure for induced current in the pipe wall. The induced current produces a received signal in each receiving antenna coil 17. The received signal (see FIG. 5) is processed by the filters and amplifiers, digitized, and stored in memory of the respective receiver unit. The received signal is then downloaded to the computer for further processing and display.

Each receiver unit can be equipped with a signal averager 55. The signal averager 55 stacks a number of received signals obtained with the receiving antenna coil at the same position by taking the average of the received signals. Stacking can be performed by each receiver unit 19 to minimize data transfer, or can be performed by the computer 21.

The computer 21 may perform additional processing of the received signals. One type of processing the computer may perform is to send the received signals through a median filter 57 to remove noise impulses caused by sferics. When a received signal is digitized, it becomes a time series of digitized values. The median filter 57 scans a received signal's time series with a window of fixed length. The window contains a constant number of digital time samples from the time series. For each window, the median filter takes the median value of the digital time samples present in that window. Then, the window is slid one digital time sample, and the median value of the digital time samples present in the window is determined. The window is slid along the length of the time series taking median values of the contents of the window along the way. A first new time series is created from the median values. The median filter iteratively processes the received signal until the processed received signal converges. Iteration occurs by having the median filter scan the first new time series, determining the median values of the scanned first new time series, and creating a second new time series from the new median values. The second new time series is put back through the median filter to create a third new time series and so on until convergence occurs, wherein there is little change between consecutive new time series. The number of iterations is dependent upon the width of the window. The wider the window used (the more time samples in the window), the more iterations that are necessary to obtain convergence. Median filtering can be implemented by software in the computer.

With the apparatus of the present invention, an arbitrary number of receiving antenna coils and transmitting antenna coils can be used. When plural receiving antenna coils are used, the apparatus forms a multichannel distributed system, which allows considerable flexibility in adapting the apparatus to a variety of containers. Flexibility in configuring the apparatus is particularly useful where access to the container is limited or where the container has a geometrical configuration that would influence the information received. For example, by providing receiving antenna coils on each side of the transmitting antenna coil on a pipeline, ratiometric measurements could be obtained. Other configurations could take advantage of any elbows, valves, and flanges found on pipelines. The apparatus can be configured in many ways, including, the number, size, and type of receiving antenna coils, the number of receiver units, the number, size, and type of transmitting antenna coils, and the number of transmitter units. By adding receiver channels, a receiver unit could service two or more receiving antenna coils at the same time. Also, receiving antenna coils can be made interchangeable so that various types and sizes of coils could be used by each of the receiver units.

The apparatus offers logistical advantages over prior art apparatuses. This is particularly true when surveying relatively inaccessible pipelines such as might be found in a refinery. The antennas and units can be made physically small to fit into small spaces between pipelines. With the apparatus of the present invention, an operator utilizes many transmitting and receiving antennas so that he can minimize the number of trips out to the pipeline for equipment setup. Furthermore, the apparatus allows data acquisition on both the leading edge and the trailing edge of the transmitter pulse, thus doubling the speed of data acquisition over prior art apparatuses utilizing only the trailing edge.

The foregoing disclosure and the showings made in the drawings are merely illustrative of the principles of this invention and are not to be interpreted in a limiting sense.

I claim:

1. A transient electromagnetic apparatus for detecting irregularities on conductive walls of container means, comprising:
   (a) a transmitting antenna adapted to be placed in proximity to a conductive wall of said container means;
   (b) a transmitter unit connected to said transmitting antenna, said transmitter unit providing abruptly changing current to said transmitting antenna so as to establish an electromagnetic field around said transmitting antenna;
   (c) a receiving antenna adapted to be placed in proximity to said wall;
   (d) a receiver unit connected to said receiving antenna, said receiver unit comprising a pre-amplifier, a low pass filter, and an analog-to-digital converter; said pre-amplifier, said low pass filter, and said analog-to-digital converter being serially interconnected, said analog-to-digital converter converting analog signals from said preamplifier and said low pass filter to digital signals;
   (e) said receiver unit having common mode noise rejection means comprising a common mode choke and balanced input impedances into the preamplifier, said choke being serially interconnected with the receiving antenna;
   (f) said low pass filter being a Bessel type filter;
   (g) said receiver unit further comprising a gain ranging amplifier connected with the analog input of said analog-to-digital converter, said gain ranging amplifier receiving feedback from the digital output of said analog-to-digital converter, such that the gain of said gain ranging amplifier is dependent upon the digital output of the analog-to-digital converter, wherein said gain ranging amplifier provides greater resolution for small received signal levels;
   (h) control means for controlling the operation of said transmitter and receiver units by controlling the abrupt change in current provided to said transmitting antenna and synchronizing the operation of the receiver unit so as to detect the presence of and the decay of a current induced into the container means wall by the transmitting antenna.

2. The transient electromagnetic apparatus of claim 1 wherein said low pass Bessel filter is a first low pass filter, further comprising a second low pass Bessel filter wherein said first low pass filter is connected with the input of said pre-amplifier and said second low pass filter is connected with the output of said pre-amplifier with said second low pass filter having a cutoff frequency which is lower than the cutoff frequency of said first low pass filter.

3. The transient electromagnetic apparatus of claim 2 wherein said first and second low pass filters are at least third order filters to prevent aliasing.

4. The transient electromagnetic apparatus of claim 1 wherein said control means comprises a digital computer.

5. The transient electromagnetic apparatus of claim 4 wherein said receiver unit and said transmitter unit are separated from each other so as to form a distributed system which is controlled by said control means, said receiver unit being connected to said receiver antenna by conductors having lengths which are short so as to substantially reduce the amount of ambient electromagnetic noise picked up by said conductors.

6. The transient electromagnetic apparatus of claim 4 wherein said computer comprises a median filter for filtering out sferics noise.

7. The transient electromagnetic apparatus of claim 4 wherein said control means synchronizes the operation of the receiver unit so as to detect the presence of and the decay of currents induced into the container means wall by the abrupt energization of said transmitting antenna and by the abrupt deenergization of said transmitting antenna.

8. A transient electromagnetic apparatus for detecting irregularities on conductive walls of container means, comprising:
   (a) a transmitting antenna adapted to be placed in proximity to a conductive wall of said container means;
   (b) a transmitter unit connected to said transmitting antenna, said transmitter unit providing an abruptly changing current to said transmitting antenna so as to establish an electromagnetic field around said transmitting antenna;
   (c) plural receiving antennas adapted to be placed in proximity to said wall, wherein said receiving antennas can be placed at separate locations along said wall;
   (d) plural receiver channels, with each receiver channel being connected to a respective receiving antenna by conductors having lengths which are short so as to substantially reduce the amount of ambient electromagnetic noise signals picked up by said conductors, each of said receiver channels comprising a pre-amplifier, a low pass filter, and an analog-to-digital converter; for each of said receiver channels said respective pre-amplifier, said respective low pass filter, and said respective analog-to-digital converter being serially interconnected, said respective analog-to-digital converter converting analog signals from said respective pre-amplifier and said respective low pass filter to digital signals;
   (e) each of said receiver channels having respective common mode noise rejection means comprising a common mode choke and balanced input impedances into the respective pre-amplifier, said choke being serially interconnected with the respective receiving antenna;
   (f) each of said low pass filters being a Bessel type filter;
   (g) said receiver channels being located in a receiver unit, said receiver unit and said transmitter unit being separated from each other so as to form a distributed system;
   (h) control means for controlling the operation of said transmitter unit and said receiver channels by controlling the abrupt change in current provided to said transmitting antenna and synchronizing the operation of the receiver channels so as to detect the presence of and the decay of a current induced into the container means wall by the transmitting antenna.

9. The transient electromagnetic apparatus of claim 8 wherein in each of said receiver channels said low pass Bessel filter is a first low pass filter, each of said receiver channels further comprising a second low pass Bessel filter wherein said respective first low pass filter is connected with the input of said respective pre-amplifier and said respective second low pass filter is connected with the output of said respective pre-amplifier with said respective second low pass filter having a cutoff frequency which is lower than the cutoff frequency of said respective first low pass filter.

10. The transient electromagnetic apparatus of claim 9 wherein said respective first and second low pass filters are at least third order filters to prevent aliasing.

11. The transient electromagnetic of claim 8 wherein each of said receiver channels further comprises a gain ranging amplifier connected with the analog input of said respective analog-to-digital converter, each of said gain ranging amplifiers receiving feedback from the digital output of said respective analog-to-digital converter, such that the gain of said gain ranging amplifier is dependent upon the digital output of the respective analog-to-digital converter, wherein said gain ranging amplifier provides greater resolution for small received signal levels.

12. The transient electromagnetic apparatus of claim 11 wherein said control means comprises a digital computer.

13. The transient electromagnetic apparatus of claim 12 wherein said control means synchronizes the operation of said receiver channels so as to detect the presence of and the decay of currents induced into the container means wall by the abrupt energization of said transmitting antenna and by the abrupt de-energization of said transmitting antenna.

14. The transient electromagnetic apparatus of claim 13 wherein in each of said receiver channels said low pass Bessel filter is a first low pass filter, each of said receiver channels further comprising a second low pass Bessel filter wherein said respective first low pass filter is connected with the input of said respective pre-amplifier and said respective second low pass filter is connected with the output of said respective pre-amplifier with said respective second low pass filter having a cutoff frequency which is lower than the cutoff frequency of said respective first low pass filter.

15. The transient electromagnetic apparatus of claim 12 wherein said computer comprises a median filter for filtering out sferics noise.

16. A transient electromagnetic apparatus for detecting irregularities on conductive walls of container means, comprising:
   (a) at least one transmitting antenna adapted to be placed in proximity to a conductive wall of said container means;
   (b) at least one transmitter unit connected to said transmitting antenna, said transmitter unit providing an abruptly changing current to said transmitting antenna so as to establish an electromagnetic field around said transmitting antenna;
   (c) plural receiving antennas adapted to be placed in proximity to said wall, wherein said receiving antennas can be placed at separate locations along said wall;
   (d) plural receiver channels, with each receiver channel being connected to a respective receiving antenna by conductors having lengths which are short so as to substantially reduce the amount of ambient electromagnetic signals picked up by said conductors, each of said receiver channels comprising a pre-amplifier, a low pass filter, and an analog-to-digital converter; for each of said receiver channels said respective pre-amplifier, said respective low pass filter, and said respective analog-to-digital converter being serially interconnected, said respective analog-to-digital converter converting analog signals from said respective pre-amplifier and said respective low pass filter to digital signals;
(e) each of said receiver channels having respective common mode noise rejection means comprising a common mode choke and balanced input impedances into the respective pre-amplifier, said choke being serially interconnected with the respective receiving antenna;
(f) each of said low pass filters being a Bessel type filter;
(g) said receiver channels being located in plural receiver units, said receiver units and said transmitter unit being separated from each other so as to form a distributed system;
(h) each of said receiver channels having a gain ranging amplifier connected with the analog input of said respective analog-to-digital converter, each of said gain ranging amplifiers receiving feedback from the digital output of said respective analog-to-digital converter, such that the gain of said gain ranging amplifier is dependent upon the digital output of the analog-to-digital converter, wherein said gain ranging amplifier provides greater resolution for small received signal levels;
(i) control means for controlling the operation of said transmitter unit and said receiver channels by controlling the abrupt change in current provided to said transmitting antenna and synchronizing the operation of the receiver channels so as to detect the presence of and the decay of a current induced into the container means wall by the transmitting antenna.

* * * * *